Feb. 22, 1938. C. S. HAZARD 2,109,353
AUTOMATIC ZEROIZING DEVICE FOR DISPENSING PUMPS
Filed June 2, 1936 2 Sheets-Sheet 1
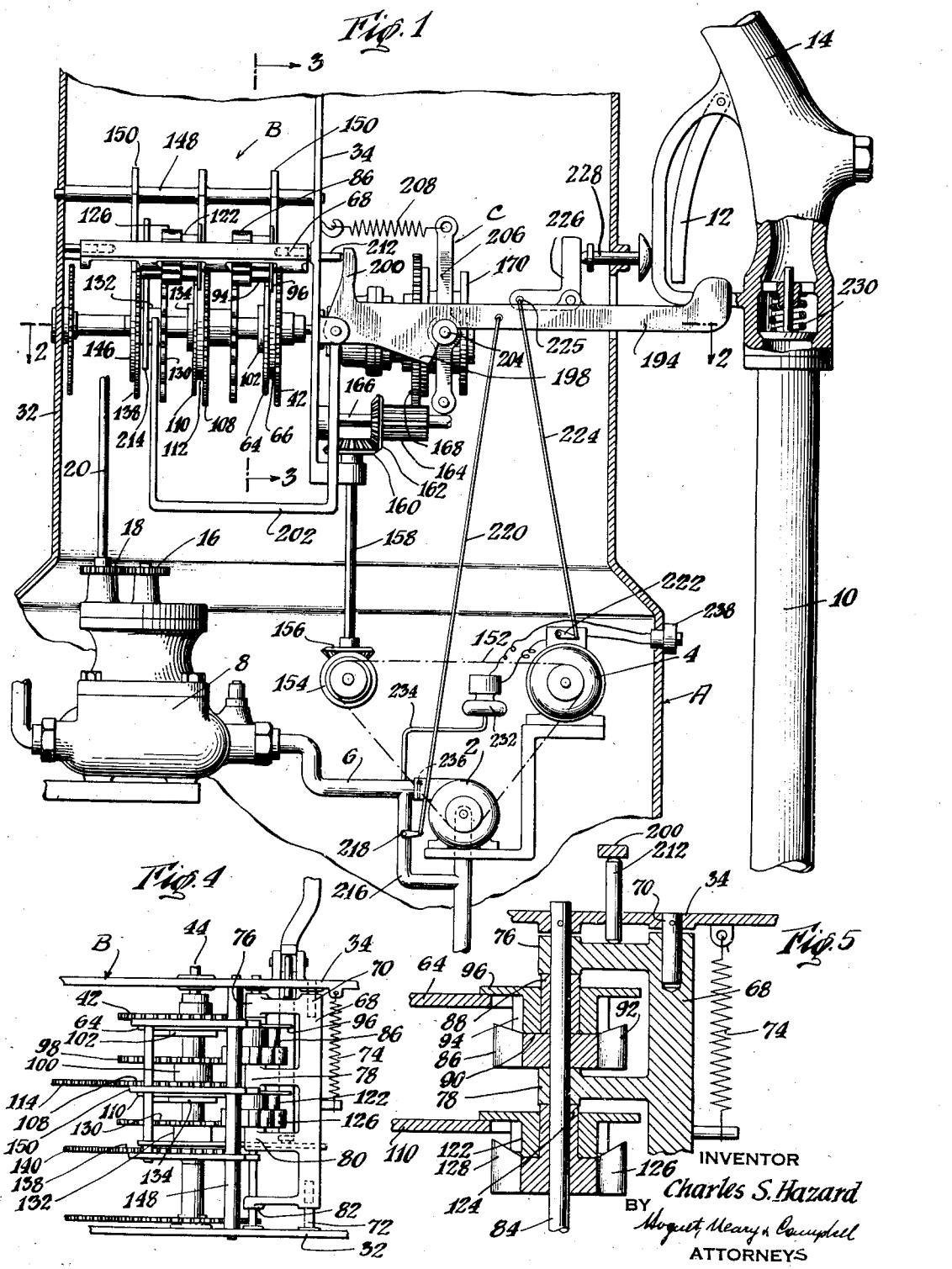

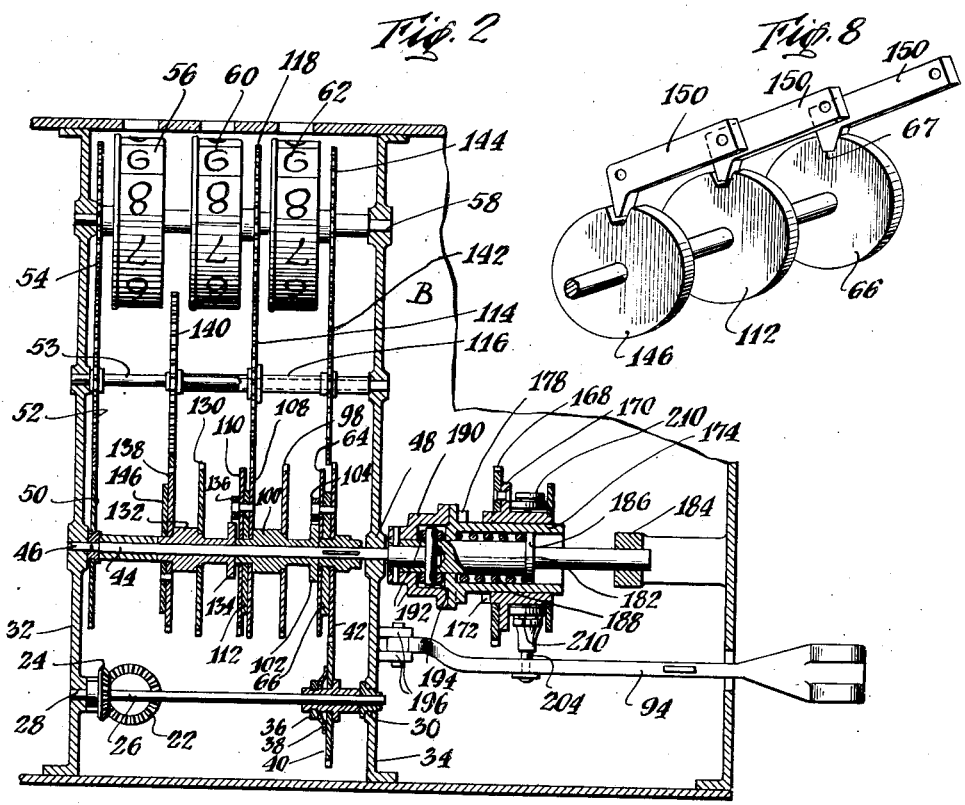
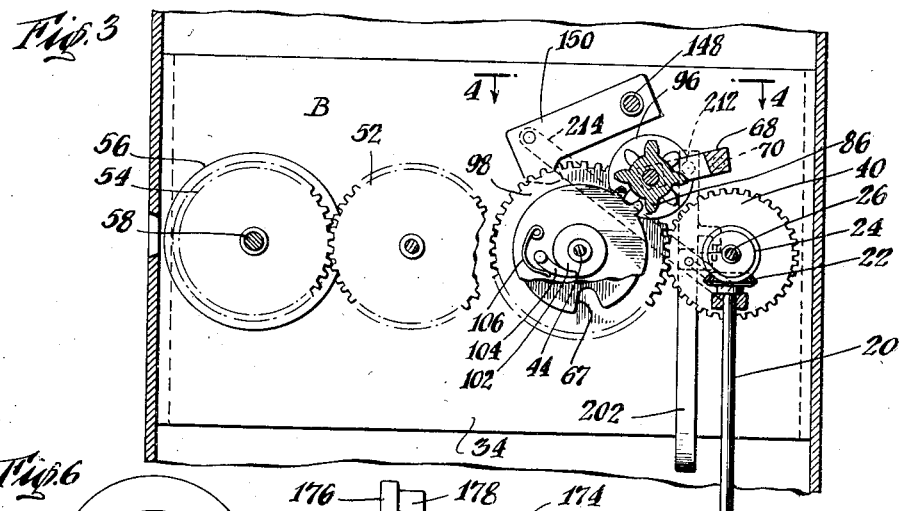
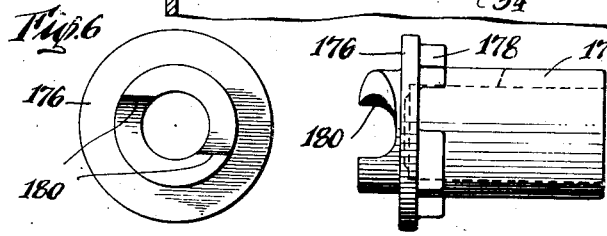

Patented Feb. 22, 1938

2,109,353

UNITED STATES PATENT OFFICE 2,109,353

AUTOMATIC ZEROIZING DEVICE FOR DISPENSING PUMPS

Charles S. Hazard, New York, N. Y., assignor to Neptune Meter Company, a corporation of New Jersey Application June 2, 1936, Serial No. 83,030

30 Claims. (Cl. 221—95)

The present invention relates to operating and control means for dispensing pumps such as those commonly used in gasoline filling stations and to registering mechanisms adapted for use therewith.

Dispensing pumps of the type to which the present invention relates consist generally of a motor-actuated pump, a meter for measuring the liquid dispensed and a register controlled by the meter for indicating to the customer the quantity of liquid dispensed and in some instances the cost of the liquid. In order to accurately indicate the quantity of liquid dispensed in each transaction it is necessary to reset the register, prior to starting the transaction. In order to avoid the possibility of inadvertent or intentional failure to reset the register properly, devices either manually or otherwise operated have heretofore been devised for preventing a dispensing operation from taking place prior to zeroizing of the register.

Some of these devices include spring or weight operated resetting means which initiate operation of the dispensing pump at the conclusion of the resetting operation. Others include manually actuated means which act to reset the register, and then start the pump and actuate a flow control means simultaneously.

Those resetting means which have heretofore been actuated by a spring or weight have been so constructed that they impose a load on the meter during the dispensing operation, due to the fact that the weight is raised or the spring is placed under tension by a movement of the indicator away from its zero position under power derived from the meter. The load on the meter is thereby increased and leakage or inaccurate operation of the meter tends to result particularly when the indicator or registering mechanism used also imposes a load upon the meter. Furthermore, each of these types of devices requires supplementary means for actuating the resetting device, and it has been found that such supplementary means may be manipulated to give false readings on the register.

The present invention overcomes this fault of the devices now in use, by eliminating the use of supplementary means for resetting the register, and provides a simplified operating construction which is fully automatic and cannot be diverted from a predetermined cycle of operation by tampering with the controls. Moreover the resetting mechanism derives its power for operation from means other than the indicator or meter, so that no load is imposed on the meter by the resetting means.

More specifically, the dispensing device of the present invention in its preferred form utilizes the pump motor as a source of power for actuating the resetting means for the register.

In order to render the operation of my apparatus completely automatic, a single actuating means is provided which initiates operation of the device as a whole, but when once actuated exerts no control over the device, except to stop it. The operation of the mechanism is thereafter entirely automatic in that the register is reset and liquid flow started sequentially, without variation in sequence and without possibility of dispensing even a minute portion of liquid until the register is reset.

As the pump motor is utilized to actuate the register resetting mechanism, the present invention includes means for diverting the liquid pumped during the resetting operation so that it is impossible for the meter to be actuated or for liquid to slip through and give a false reading.

The present invention also includes an improved means for allowing a register to be reset without placing undue stresses upon the elements of the register. While this construction is of general application it is here shown as embodied in a dispensing pump. Registers heretofore used in connection with dispensing devices, have required the provision of a plurality of friction clutches to allow independent movement of the numeral wheels of the register during the resetting operation. In connection with the present invention, provisions have been made for positively disconnecting the numeral wheels of the register whereby they may be freely operated without wear and torsional resistance to rotation as is occasioned by the use of friction clutches. Also the present register is provided with means for stopping the numeral wheels at zero position. The zero stop means are so constructed and arranged that the shock and strain caused by engagement of the parts at zero position are received by mechanisms associated with one of the wheels only and are not transmitted to the remaining wheel mechanisms. Nevertheless, the wheels are maintained in accurate alignment by the construction later described.

With the above description in mind, for a better understanding of the invention, reference may be had to the accompanying drawings in which:

Figure 1 is a sectional view of a typical form of dispensing device embodying the present invention with parts thereof broken away;

Figure 2 is a transverse section taken on line 2—2 of Figure 1, with the nozzle of the hose removed from the hose support and with parts thereof broken away;

Figure 3 is a sectional view taken on line 3—3 of Figure 1, with a portion broken away;

Figure 4 is a detail view of a portion of the register;

Figure 5 is an enlarged view of a detail of the register, partly broken away;

Figure 6 is an enlarged end view of an element of the resetting mechanism;

Figure 7 is a side view of the element in Figure 6; and

Figure 8 is a perspective view of discs and pawl means for locking the register in zero position, the associated gears being removed.

Illustrative of one embodiment of my invention, Figure 1 discloses a dispensing apparatus including a housing A, in which is mounted a pump 2, actuated by a motor 4 for delivering fluid from a source of supply (not shown) through conduit 6 to a meter 8 of any desired type, and from the meter to the usual dispensing hose 10 from which the liquid may be dispensed under the control of hand-operated valve 12 on nozzle 14. In common with dispensing devices of this type the meter 8 actuates a register generally indicated at B, for indicating to the customer the quantity of liquid dispensed and/or the cost of the liquid dispensed.

*Registering mechanism*

Operation of the meter 8 by passage of liquid therethrough rotates gears 16 and 18 and shaft 20 to which is pinned gear 22 (Figures 2 and 3). Rotation of gear 22 turns gear 24 and shaft 26 to actuate one or more registers as desired. Shaft 26 is rotatable in bearings 28, 30 in frame plates 32 and 34, respectively, and carries a fixed hub 36 having spring fingers 38, thereon. Hub 36 also carries a relatively rotatable gear 40 against which the spring fingers 38 bear forming in effect a friction clutch. Gear 40 meshes with and drives gear 42 keyed to shaft 44 which extends parallel to shaft 26 and is journalled in bearings 46, 48 in frame plates 32, 34 respectively.

The shaft 44 serves as the main drive shaft from which the numeral wheels of the register are driven. To the left hand end of this shaft as seen in Figure 2 is pinned a gear 50 rotatable with the gear 42. The gear 50 drives the units wheel 56 of the register B through gear 52 journalled on fixed shaft 53, and gear 54 fixed to units wheel 56 and rotatably mounted on shaft 58. It will be understood that the connections between the meter 8 and the units wheel 56 are so constructed that passage of one unit, such as a gallon, of fluid through the meter will cause displacement of the wheel 56 through one units space, the wheel 56 being divided into ten spaces numbered from 0 to 9 inclusive. The shaft 58 extends between frame plates 32, 34 and also carries tens wheel 60 and hundreds wheel 62, all of which wheels are independently rotatable on said shaft.

The mechanism for actuating the tens wheel 60 and hundreds wheel 62 is driven from gear 42. This gear has a mutilated two-toothed gear 64 attached fixedly thereto and spaced therefrom by a plate 66 having a notch 67 in its periphery. The mutilated gear 64 produces in operation, an intermittent rotation of mechanism connected to the tens numeral wheel 60 through gears carried by a yoke 68 and operable so that one revolution of shaft 44 and numeral wheel 56 will produce one tenth of a revolution of tens wheel 60.

As best shown in Figures 1, 3, 4 and 5, the yoke 68 mounted between the frame plates 32 and 34 for sliding movement on pins 70, 72 is normally retained adjacent frame plate 34 by spring 74. The yoke is provided with arms 76, 78, 80 and 82 slidably receiving shaft 84 pinned in the frame plates 32 and 34. Between the arms 76 and 78 and rotatably mounted on shaft 84 is a gear 86 having a collar 88 spanning the space between arms 76 and 78 so as to be moved with the yoke 68 on displacement of the latter. The gear 86 has a flat lateral face 90 and inclined teeth 92 which extend outwardly beyond the lateral face 90 and engage between the teeth of gear 94 slidably and rotatably mounted on the collar 88. The spring 74 urges the two gears 86 and 94 together and the interfitting teeth lock them for rotation together during a registering operation while permitting disengagement of the gears by movement of gear 86 upon displacement of the yoke during a resetting operation. The gear 94 is provided with a flange 96 which extends inwardly between gears 42 and 64 preventing displacement thereof upon movement of the yoke and gear 86 and maintaining the gear 94 at all times in position to be engaged by mutilated gear 64.

Gear 64 having only two teeth acts as a Geneva gear to rotate gear 94 through one quarter of a revolution for every complete revolution of gears 64 and 42 and every complete rotation of units wheel 56. The engagement of the interlocking teeth of gears 86 and 94 also causes gear 86 to rotate one quarter turn for each complete revolution of gear 64 and the units wheel. Gear 86 when in the position shown in Figure 5 meshes with a gear 98 fixed to a hub member 100 which is rotatable on shaft 44 (Figure 2). The gear ratio between gears 86 and 98 is so proportioned that each quarter revolution of gear 86 corresponding to a complete revolution of the units wheel causes gear 98 and hub 100 to be rotated one tenth of a revolution. Gear 108 secured to the hub 100 for rotation therewith meshes with and drives gear 114 loosely journalled on sleeve 116 which is rotatably mounted on shaft 53. Gear 114 also meshes with and drives gear 118 fixed to tens numeral wheel 60 so that a complete rotation of units numeral wheel 56 will be accompanied by a displacement of one tenth of a revolution of tens numeral wheel 60.

Hub member 100 is provided with a ratchet 102, adjacent gear 64, which is engageable with a pawl 104 carried by gear 64, and biased against ratchet 102 by spring 106 (Figure 3). The function of the pawl 104 and ratchet 102 will be later described, as they are parts of the means for resetting the register.

Secured to the opposite end of hub 100 from the ratchet 102, are gears 108 and 110 connected together but separated by a spacer plate 112 having a notch therein similar to notch 67 in plate 66. Gear 108 is identical with gear 42 and gear 110 is a two-toothed mutilated gear like gear 64. Hundreds numeral wheel 62 is actuated by tens wheel through connections similar to those for driving the tens wheel in predetermined relation to the units wheel. As shown in Figure 5 a complete rotation of mutilated gear 110 causes a one tooth displacement of pinion 122 (Figure 5)

journalled on hub 124 of gear 126 which is journalled in turn on shaft 84 of the yoke 68 between arms 78 and 80. The coacting tapered teeth 128 of gear 126 engage between the teeth of gear 122 and also cause the gears 122 and 126 to rotate together to drive gear 130 fixed to hub 132 journalled on shaft 44 (Figure 2). Hub 132, like hub 100 carries a ratchet 134 cooperating with spring biased pawl 136 on gear 110. Hub 132 also carries gear 138 which upon rotation of hub 132 rotates gear 140 pinned to sleeve 116 on shaft 53 and turns gear 142 also pinned to sleeve 116 to rotate gear 144 attached to hundreds wheel 62, thereby advancing it one numeral space for each complete rotation of the tens wheel.

Fixed to gear 138 is a notched disk 146 similar to spacer disks 66 and 112. The function of notched disks 66, 112 and 146 will be hereinafter discussed.

From the foregoing description it will be seen that rotation of meter shaft 20 will drive shaft 44 through clutch 38, 40 and gear 42 turning the units wheel 56 directly. Each complete revolution of the mutilated gear 64 will cause the displacement of tens numeral wheel 60 through one tenth of a revolution, and each complete revolution of mutilated gear 110 moving with tens wheel 60 will displace the hundreds wheel 62 through one tenth of a revolution, thus properly registering the quantity of fluid passing through the meter in units of from 1 to 999. It will be obvious from the foregoing that the register B can be provided with a greater or lesser number of numeral wheels and that a conventional pointer and dial indicator can be driven from shaft 44. It will also be evident that more than one register B may be provided on different sides of the pump housing A and driven from shaft 26 and that a recorder for totalling all dispensing operations may also be driven from shaft 26.

*Resetting mechanism for the register*

After the meter 8 has actuated the register B to register the quantity or cost of the fluid dispensed in one operation, the numeral wheels 56, 60 and 62 are returned to zero before a succeeding registering and dispensing operation is started. The resetting mechanism illustrated is actuated by the pump motor 4 and is driven from shaft 44.

For this purpose the mechanism indicated generally as C, is provided to rotate the shaft 44 in a direction opposite to that in which it is driven by meter 8. As the numeral wheels 56, 60 and 62 are not driven at the same rate of speed, they would lock the mechanism if some means were not provided for releasing them for independent rotation. As previously mentioned, and as shown in Figure 5, the yoke 68 is shiftable relative to shaft 84 against the tension of spring 74 to move gears 86 and 126 out of engagement with gears 94 and 122 respectively permitting independent relative movement between hubs 132 and 100 and shaft 44. As shaft 44 rotates it turns gears 42 and 64, spacer plate 66 and pawl 104 relatively to hub 100 and ratchet 102. The pawl 104 and ratchet 102 are so located that they engage when the zeros on numeral wheels 56 and 60 are in alignment, and "pick up" hub 100 for rotation with shaft 44. As hub 100 rotates pawl 136 engages ratchet 134 when the zero on wheel 62 aligns with the zeros on wheels 56 and 60 so that all three numeral wheels may be returned to their initial position together.

In order to stop the wheels 56, 60 and 62 at initial position, a latch 148 (best shown in Figures 1, 3, 4 and 8) is pivotally mounted between frame plates 32, 34. The latch 148 includes three rigidly attached hook-shaped members 150 which are adapted to engage the notches in spacer plates 66, 112 and 146 when the numeral wheels 56, 60 and 62 are at their initial or zero position, to lock them against further rotation. As the hooks 150 are rigid with respect to each other, they will not drop into the notches until the notches in plates 66, 112 and 146 are all in alignment, and the numeral wheels are each in zero position. The notches in plates 66, 112 and 146 are preferably in exact alignment whereas the ends of the hooks 150 are slightly out of alignment, the end of the hook 150 which engages in notch 67 associated with the units wheel being widest and that associated with the hundreds wheel narrowest. When the hooks 150 enter the notches that hook which enters notch 67 engages the side of the notch first while the edges of the other hooks are nearer the center of the notches in plates 112 and 146 (Figure 8). A slight lag is thus introduced between the final setting of the numeral wheels so that the strain or shock imposed on the mechanism in stopping the resetting movement thereof is distributed and the initial shock is received by plate 66 and shaft 44 and is not transmitted to the remaining numeral wheels. As will be understood, the meter 8 is not rotated during the resetting rotation of shaft 48 because spring fingers 38 on shaft 22 slip relatively to gear 40.

*Automatic control for resetting the register*

As previously described the shaft 44 and register B are driven during the resetting operation through a mechanism C. The mechanism C is actuated by the motor 4 through the medium of a chain or belt 152 which also connects the motor 4 to the pump 2. Operation of motor 4 through chain 152 rotates bevel gears 154 and 156, the latter being pinned to shaft 158 journalled on the frame plate 34, and carrying at its opposite end bevel gear 160. Rotation of bevel gear 160 also causes rotation of bevel gear 162 fixed to barrel gear 164. The barrel gear is fixed to shaft 166, journalled in frame plate 34 and drives gear 168 and causing rotation of collar 170 to which gear 168 is fixed. As best shown in Figure 2, collar 170 includes clutch element 172 and is slidable along and journalled on a sleeve 174. Sleeve 174 as shown in Figure 7 includes a flange 176 having clutch lugs 178 thereon cooperating with clutch element 172 in one position of collar 170. Sleeve 174 is also provided with spaced cam faces 180, serving to move the sleeve lengthwise of shaft 182. Sleeve 174 is supported for rotation on the enlarged shaft 182 fixed to shaft 44 and journalled in the bracket 184 on frame A. The shaft 182 is provided with a flange 186, and a spring 188 is disposed between it and the end of sleeve 174 forcing the flange 176 into engagement with a housing 190 which is also pinned to shaft 182. The cam faces 180 are thus forced into engagement with rollers 192 rotatably mounted on a pin 194 passing through shaft 182. The action of spring 188 normally forces the rollers 192 into the valleys of the cams 180 and causes the sleeve 174 to rotate with shaft 182. However when the register B is locked in zero position by hooks 150 and the sleeve 174 is rotated relative to shaft 182 by the motor 4 through engagement of clutch elements 172 and 178 the cam faces 180 ride up on the rollers 192 displacing sleeve 174 and collar 170 to the right, as viewed in Figure 2 and terminating the resetting movement.

In order to control the engagement and disengagement of clutch elements 178 and 172 and consequently the resetting of the register, movement of the collar 170 can be controlled by any suitable means but as shown this movement is controlled by a hose support 194 pivotally mounted between lugs 196 on frameplate 34. The hose support is provided with a cam lug 198 on its lower edge, a lever 200 on its upper edge and a U-shaped lever 202 projecting downwardly from adjacent the pivot of the support. The cam lug 198 cooperates with a pin 204 on a yoke 206 pivotally mounted at its lower end on the frame A. The arms of yoke 206 are disposed in the collar 170 and urged by spring 208 to the left in Figures 1 and 2 in a direction to cause the clutch elements 172, 178 to engage. Rollers 210 are rotatably supported on the yoke 206 and engage the collar 170 to reduce the friction therebetween as the collar is rotated by gear 168 and motor 4. The upwardly projecting lever 200 engages a pin 212 freely slidable through the frameplate 34 and engaging the yoke 68 whereby upward movement of the support 194 will shift yoke 68 to the left for disengaging the gears 82 and 126 from gears 94 and 122. The U-shaped lever 202 is connected by link 214 to hooks 150 whereby upward movement of the hose support 194 in initiating the resetting operation will permit the hooks 150 to enter the notches in disks 66, 112 and 146 to lock the register B in zero position.

In order to control the liquid flowing from the pump 2 to meter 8 during the resetting of register B, a bypass 216 connecting the conduit 6 to the inlet of the pump 2 is provided. A butterfly valve 218 is mounted in the bypass 216 and is connected by link 220 to hose-support 194, the valve 218 being closed when the hose-support 194 is in its lower position but movable to an open position as the support 194 moves upward.

The motor 4 is started and stopped by means of a switch 222 which is connected by link 224 to a pin 225 mounted on one arm of a bell crank lever 226 and extending across the support 194. When the nozzle 14 is placed upon support 194, a portion of the nozzle engages pin 228 slidably mounted in casing A, and shifts it to the left as viewed in Figure 1, thereby contacting and rocking the bell crank lever 226 about its pivot and opening the switch.

The resetting operation

A dispensing operation having been concluded, and with the nozzle 14 on support 194, the motor 4 will be stopped and the register B will indicate the quantity of liquid dispensed in the preceding transaction.

To dispense a further quantity of liquid the nozzle 14 is removed from the support 194 and the support 194 lifted. As the support moves upwardly the bell crank 226 is rotated clockwise by engagement of the support 194 with pin 225 moving switch 222 to "on" position and starting the motor 4. This movement also opens butterfly valve 218. At the same time, cam lug 198 moves upwardly out of engagement with pin 204 permitting the spring 208 to move the yoke 206 and collar 170 to the left as seen in Figure 1 so as to engage clutch elements 172 and 178 thereby coupling motor driven gear 168 to shafts 186 and 44. Also at the same time, the lever 200 will move pin 212, and yoke 68 thus freeing the numeral drums 56, 60 and 62 for independent rotation and allowing the register B to be reset as previously described. At the same time U-shaped lever 202 through link 214 drops hooks 150 into engagement with the notched disks 66, 112 and 146 and allowing them to drop in to the notches in the disks when they reach aligned zero position.

The motor 4 through the chain 152, gears 154 and 156, shaft 158, and gears 160, 162 and 164 rotates coupled gear 168 and shaft 44 returning the register to zero reading. When the register G is reset, the hooks 150 will engage and lock the register and shafts 44 and 182 against further rotation. However the gear 168, collar 170 and sleeve 174 will continue to rotate and cams 190 will rotate relatively to rollers 192 causing the sleeve 174 and collar 170 to be displaced along shaft 182 against the action of spring 206 until the pin 204 passes beyond cam lug 198 on the support 194, thus permitting the support 194 to drop, raising the hooks 150, and permitting the yoke 68 to return to its normal position. The collar 170 is thus locked against movement to the left as viewed in Figure 1, by the cam surface 198 but the clutch elements 172 and 178 are not disengaged until the rollers 192 strike the valleys of cams 190. When this occurs, the sleeve 174 slides to the left causing the clutch elements 172 and 178 to disengage and freeing shafts 44 and 182 for rotation by the meter. However the gear 168 and collar 170 continue to rotate freely.

In order to avoid inaccurate reading on the register B, due to flow of fluid during the resetting operation, the bypass 216 and valve 218 act with the hose support 194, as follows:

As the support 194 moves upwardly starting the motor 4, the valve 218 opens and the liquid is by-passed to the inlet side of pump 2 without actuating the meter 8. As the support 194 drops after the register B is reset, the valve 218 closes directing the fluid to the meter 8, from which it passes to the dispensing hose 10 and nozzle 14, whereby liquid may be dispensed by opening the hand valve 12. It will be understood of course that the by-pass 216 and valve 218 operate independently of the usual by-pass provided to permit operation of the motor and pump continuously during a dispensing operation while delivery is controlled by the hand valve 12.

In order to prevent drainage of the hose 10, so that the quantity of liquid passed through the meter 8 will always be accurately registered, the nozzle 14 may be provided with a spring loaded check valve 230.

In order to prevent needless operation of motor 4 between the time that the register B reaches zero and the hand valve 12 is opened to dispense liquid, a pressure operated switch 232 of the type disclosed in Fagan U. S. Patent No. 2,020,112 or Fagan et al., U. S. Patent No. 1,934,050 is connected to the motor 4, and actuated by varying pressure in a take-off conduit 234 connected to conduit 6 between the pump 2 and meter 8. A check valve 236 is mounted in conduit 6 between take-off conduit 234 and pump 2.

The pressure switch 232 is moved to "off" position by a building up of pressure in conduit 6, and moves to "on" position when the pressure drops.

In operation, when the bell crank lever 226 is rocked by upward movement of hose-support 194, the motor switch 222 is moved to "on" position, and by-pass valve 218 is opened, thereby decreasing the pressure in conduit 6 and allowing pressure switch 232 to move to "on" position starting motor 4 and pump 2. The liquid is recirculated under low pressure through by-pass 216 until the register B reaches zero. At this time the hose-support 194 drops and by-pass valve 218 is closed. When valve 218 closes and nozzle valve 12 is not opened, pressure builds up in conduit 6 and take-off conduit 234, thereby moving pressure switch 232 to "off" position and stopping motor 4. Check-valve 236 closes under the back-pressure and maintains pressure in conduit 6 until nozzle valve 12 is opened thereby permitting a slight drop in pressure in conduit 6 and permitting pressure switch 232 to move to "on" position starting motor 4. Closure of hand valve 12 at the conclusion of a dispensing operation again causes pressure to build up in conduit 6 and stops motor 4.

The pressure switch 232 also is advantageous in the event of an accident occurring to the attendant, because either intentional or inadvertent release of nozzle 14, and consequent closing of hand valve 12 will automatically stop motor 4 and pump 2, thereby reducing the fire hazard.

In addition, the pressure actuated valve 232 makes it possible to reset the register B to zero at the conclusion of a dispensing operation, without necessitating the immediate dispensing of a further quantity of liquid.

The pressure switch 232 may be connected to a manually controlled master switch 238 mounted on the casing A. The master switch 238 opens and closes the main circuit through pressure switch 232 and motor 4.

Having described one embodiment of my invention, it is evident that there can be many variations in the specific application of the invention, and therefore it should be understood that the disclosure is intended to be illustrative of a typical embodiment of the invention and should not be construed as limiting the scope thereof as defined in the following claims.

I claim:

1. In a liquid dispensing device, liquid metering means, means for delivering liquid to said metering means, an indicator controlled by said metering means and movable away from an initial position in proportion to the amount of liquid dispensed, means for resetting said indicator to said initial position during operation of said liquid delivering means, automatically operating means energized independently of said metering means for actuating said resetting means and means controlled by said indicator preventing delivery of liquid from said liquid delivering means to said liquid metering means until said indicating means has been restored to said initial position.

2. In a liquid dispensing device, liquid metering means, means for delivering liquid to said metering means, an indicator controlled by said metering means and movable away from an initial position in proportion to the amount of liquid dispensed, means for resetting said indicator to said initial position during operation of said liquid delivering means, power driven means for actuating said resetting means, means for operatively connecting said power driven means to said resetting means only during a resetting operation and means controlled by said indicator preventing delivery of liquid from said liquid delivering means to said liquid metering means until said indicating means has been restored to said initial position.

3. In a liquid dispensing device, a meter, an indicator controlled thereby, a pump to deliver liquid to the meter, a motor for driving the pump, means actuated by said motor simultaneously with the pump and movable to a position for resetting the indicator to zero and means for preventing delivery of liquid to said meter during the resetting operation.

4. In a liquid dispensing device, a meter, an indicator controlled thereby, a pump to deliver liquid to the meter, a by-pass having a valve therein for diverting liquid from the meter, means for resetting said indicator to zero and means controlled by said resetting means for operating said valve to direct the liquid through the by-pass while the indicator is being reset.

5. In a liquid dispensing device, a meter, an indicator controlled thereby, a pump to deliver liquid to the meter, a by-pass having a valve therein for diverting liquid from the meter, a motor for actuating the pump, means for resetting the indicator to zero, and means actuated by the motor and operable when the indicator reaches zero for actuating the valve in the by-pass to deliver liquid through the meter.

6. In a liquid dispensing device, a meter, an indicator controlled thereby, a pump to deliver liquid to the meter, liquid flow control means, a motor for driving the pump, means including a clutch actuated by the motor for returning the indicator to zero, and means actuated by the motor when the indicator reaches zero for rendering the clutch inoperative and actuating the liquid flow control means to cause liquid to flow through the meter.

7. In a liquid dispensing device, a meter, an indicator controlled thereby, a pump to deliver liquid to the meter, liquid flow control means, a motor for driving the pump, means including a clutch actuated by the motor for resetting the indicator to zero, displaceable means for rendering the clutch inoperative connected to said flow control means to prevent flow of liquid through the meter during resetting of said indicator, means for initiating operation of the motor to reset the indicator to zero, and means actuated by the motor when the indicator reaches zero, for displacing the displaceable means to render the clutch inoperative and actuating the flow control means to cause liquid to flow through the meter.

8. A liquid dispensing device comprising liquid flow establishing means, liquid measuring means, and an indicator controlled by the measuring means for registering the liquid dispensed; in combination with means for resetting the indicator to zero, means controlling the flow of liquid from the flow establishing means to the meter and means for actuating the flow establishing means, said actuating means also serving to actuate the resetting means and the flow control means to reset the indicator to zero, and cause liquid to flow from the flow establishing means to the meter.

9. In a liquid dispensing device having flow establishing means and liquid metering means, indicating means movable in response to operation of the liquid metering means from initial position in proportion to the amount of liquid passed through the metering means, means to return the indicating means to initial position, means for simultaneously initiating operation of both the flow establishing means and the means for returning the indicating means to initial position and means controlled by the indicating means to prevent delivery of liquid through said liquid metering means until the indicating means reaches initial position.

10. In a liquid dispensing device, having liquid metering means, a motor and a pump actuated thereby to deliver fluid through said liquid metering means; indicating means movable by the liquid metering means from initial position in proportion to the amount of liquid passed through the metering means, means driven by said motor during operation of said pump to return the indicating means to initial position and means controlled by the indicating means to prevent delivery of liquid through said metering means until the indicating means reaches initial position.

11. In a dispensing device, a meter actuated by liquid passed therethrough, a register controlled by said meter, said register having a plurality of number wheels and means connecting the same for moving the number wheels in predetermined relation in proportion to the amount of liquid dispensed, a motor, mechanism actuated by the motor for resetting said number wheels to zero and means for initiating operation of said motor and said resetting mechanism operable to disconnect said number wheels and render them independently movable during resetting thereof.

12. In a dispensing device, a meter actuated by liquid passed therethrough, a register controlled by said meter having a plurality of number wheels, one of which indicates units and another of which indicates multiples thereof, a motor, mechanism for resetting said number wheels to zero, and means driven by said motor for actuating said resetting mechanism, members engageable to stop said number wheels in their zero positions, said members being engageable successively to stop the units wheel prior to stopping of the remainder of said number wheels, and means actuated by said motor upon stoppage of all of said number wheels to disconnect said resetting mechanism therefrom.

13. In a resettable registering device, including an indicator, and means for resetting the indicator to zero; a motor, a clutch element driven by the motor, a clutch element connected to the indicator, means for initiating operation of the motor operable to cause the clutch elements to engage and return the indicator to zero, and means controlled by the indicator for disengaging the clutch elements when the indicator reaches zero.

14. In a liquid dispensing device, a pump, a meter-actuated indicator for registering the quantity of liquid dispensed, flow control means between the pump and meter, means for resetting the indicator to zero, a motor for actuating said pump and resetting means, a clutch element operatively connected to the motor, a cooperating clutch element operatively connected to the indicator, means for initiating operation of the motor operable to cause the clutch elements to engage to return the indicator to zero, and displaceable means actuated when the indicator reaches zero to disengage the clutch elements and actuate said flow control means.

15. In a resettable register having a plurality of numeral wheels rotatable in predetermined relation during a registering operation, means for resetting said numeral wheels to zero comprising driving means, connecting elements rendered operable by movement of said driving means to reset said numeral wheels in unison and stop members successively engageable to limit the resetting movement of said numeral wheels.

16. In a resettable register having a plurality of numeral wheels rotatable in one direction and in predetermined relation during a registering operation, means for reversing the direction of rotation to reset said numeral wheels, elements engageable to rotate said numerals in unison during the resetting movement thereof and stop means positioned for successive engagement to limit the resetting movement of said numeral wheels.

17. In a liquid dispensing pump having a meter, a pump for delivering liquid to the meter, and an indicator responsive to the operation of the meter; the combination of means for resetting the indicator, a single source of power for simultaneously actuating said pump and said resetting means, and means for diverting liquid from the meter while the indicator is being reset.

18. In a liquid dispensing device, a meter, an indicator controlled thereby, a pump to deliver liquid to said meter, liquid flow control means, a motor for driving said pump, disengageable means actuated by said motor for returning said indicator to zero and means for simultaneously initiating operation of said motor, engaging said disengageable means to return said indicator to zero and actuating said liquid flow control means to prevent flow of liquid to the meter.

19. In a liquid dispensing device, a meter, an indicator controlled thereby, a pump to deliver liquid to said meter, liquid flow control means, a motor for driving said pump, disengageable means actuated by said motor for returning said indicator to zero and means for simultaneously initiating operation of said motor, engaging said disengageable means to return said indicator to zero and actuating said liquid flow control means to prevent flow of liquid to the meter, and means for disengaging said disengageable means and causing liquid to flow through said meter, when said indicator reaches zero.

20. A resettable register comprising a plurality of numeral wheels, means for rotating one of the wheels, a pinion rotated intermittently by said means, a second pinion operatively connected to a second numeral wheel normally interlocking with said first pinion to intermittently rotate said second numeral wheel, means for shifting one of said pinions out of interlocking engagement with the other pinion to allow independent rotation of each of the wheels, and means for returning the wheels simultaneously to zero.

21. In a liquid dispensing device the combination of a meter, a register actuated in accordance with the operation of said meter, said register comprising a plurality of numeral wheels, means for rotating one of the wheels, a pinion rotated intermittently by said means, a second pinion operatively connected to a second numeral wheel normally interlocking with said first pinion to intermittently rotate said second numeral wheel, means for shifting one of said pinions out of interlocking engagement with the other pinion to allow independent rotation of each of the wheels, means for resetting the wheels while independently rotatable simultaneously to zero, a motor for actuating said resetting means, and control means for simultaneously initiating operation of said motor and actuating said shifting means.

22. In a liquid dispensing device, a meter, a pump for supplying liquid to said meter, an indicator controlled by said meter, means engageable with and disengageable from said indicator for resetting the latter, a motor for actuating said resetting means, and means operative upon continued operation of said motor after said indicator has been reset for disengaging said resetting means from said indicator.

23. In a liquid dispensing device a meter, a pump for supplying liquid to the meter, a motor for actuating the pump, an indicator controlled by the meter, means actuated by the pump motor for resetting said indicator to zero, means preventing the delivery of liquid to the meter when the indicator is being reset and means actuated by continued operation of said resetting means after said indicator has been returned to zero for rendering possible the delivery of liquid from the pump to the meter.

24. In a liquid dispensing device a meter, a pump for supplying liquid to the meter, a motor for actuating the pump, an indicator controlled by the meter, means actuated by the pump motor for resetting said indicator to zero, means preventing the delivery of liquid to the meter when the indicator is being reset and means actuated by continued operation of said resetting means after said indicator has been returned to zero for rendering possible the delivery of liquid from the pump to the meter, and for disconnecting said resetting means from said indicator.

25. In a fluid dispensing device, a meter, an indicator responsive to movement of said meter, a pump, fluid flow control means between said pump and meter, a motor for actuating said pump and means driven by said motor simultaneously with said pump engageable with said indicator for resetting same to zero position, said flow control means being operable to prevent flow of fluid to the meter during engagement of said resetting means with said indicator.

26. In a dispensing device, a pump, a meter, flow control means between said pump and meter, mechanism actuatable by said meter including a plurality of number wheels, one of which indicates units and the other of which indicates multiples thereof, means engageable with said mechanism for resetting said number wheels to zero, a motor for driving said pump and resetting means, means engageable to stop said number wheels in their zero position, starting means for initiating operation of said motor, causing said resetting means to operatively engage said mechanism and actuating said flow control means to prevent flow from said pump to said meter, and means actuated by said motor upon stoppage of said number wheels at zero to disengage said resetting means and actuate said flow control means to permit flow of fluid from said pump to said meter.

27. In a liquid dispensing device the combination of a meter, a pump, means for controlling flow of liquid between said pump and meter, a register actuated in accordance with the operation of said meter, said register comprising a plurality of numeral wheels, means for rotating one of the wheels, a pinion rotated intermittently by said means, a second pinion operatively connected to a second numeral wheel normally interlocking with said first pinion to intermittently rotate said second numeral wheel, means for shifting one of said pinions out of interlocking engagement with the other pinion to allow independent rotation of each of the wheels, means for resetting the wheels while independently rotatable simultaneously to zero, a motor for actuating said pump and resetting means, and control means for simultaneously initiating operation of said motor, actuating said shifting means and operating said flow control means.

28. In a liquid dispensing device having liquid delivering means and a liquid metering means, an indicator controlled by said metering means and movable away from an initial position in proportion to the amount of liquid dispensed, means to reset the indicator to initial position, means for simultaneously initiating operation of both said liquid delivering means and the means for resetting said indicator to initial position, automatically operating means energized independently of said metering means for actuating said resetting means, and means controlled by the indicator to prevent delivery of liquid through said liquid metering means until the indicator reaches initial position.

29. In a dispensing device of the character described, a meter, means for controlling flow of fluid to said meter, a register advanceable from initial position in response to operation of said meter, means engageable with said register to reset same to initial position, a motor for operating said resetting means, means operable to simultaneously initiate the operation of said motor, actuate said flow control means to prevent flow of fluid to said meter and place said resetting means into engagement with said register, said resetting means being responsive when the register reaches its initial position to disengage and actuate said fluid control means to permit flow of fluid to said meter.

30. In a dispensing device of the type described, a meter, a pump, means for controlling flow of fluid between said pump and meter, a register advanceable from initial position in response to operation of said meter, means engageable with said register to reset same, a motor for simultaneously operating said pump and resetting means, and means for initiating operation of said motor operable to actuate said flow control means and place said resetting means into engagement with said register.

CHARLES S. HAZARD.